United States Patent
Li et al.

(10) Patent No.: US 12,264,279 B1
(45) Date of Patent: Apr. 1, 2025

(54) HIGH-TEMPERATURE AND HIGH-SALT RESISTANT HYPERBRANCHED LUBRICANT FOR WATER-BASED DRILLING FLUID, AND PREPARATION AND APPLICATION THEREOF

(71) Applicant: CHINA UNIVERSITY OF PETROLEUM (EAST CHINA), Dongying (CN)

(72) Inventors: Jian Li, Dongying (CN); Jinsheng Sun, Dongying (CN); Kaihe Lv, Dongying (CN); Jingping Liu, Dongying (CN); Meichun Li, Dongying (CN); Yingrui Bai, Dongying (CN); Xianbin Huang, Dongying (CN); Jintang Wang, Dongying (CN); Jiafeng Jin, Dongying (CN); Bo Liao, Dongying (CN)

(73) Assignee: CHINA UNIVERSITY OF PETROLEUM (EAST CHINA), Dongying (CN)

(*) Notice: Subject to any disclaimer, the term of this patent is extended or adjusted under 35 U.S.C. 154(b) by 0 days.

(21) Appl. No.: 18/914,368

(22) Filed: Oct. 14, 2024

(30) Foreign Application Priority Data

Apr. 30, 2024 (CN) .......................... 202410536000.7

(51) Int. Cl.
| C09K 8/12 | (2006.01) |
| C08F 283/12 | (2006.01) |
| C10M 107/50 | (2006.01) |
| C10M 173/02 | (2006.01) |
| C10N 20/00 | (2006.01) |

(52) U.S. Cl.
CPC ............ *C09K 8/12* (2013.01); *C08F 283/122* (2013.01); *C10M 107/50* (2013.01); *C10M 173/02* (2013.01); *C09K 2208/34* (2013.01); *C10M 2201/02* (2013.01); *C10M 2229/0535* (2013.01); *C10N 2020/071* (2020.05)

(58) Field of Classification Search
CPC ... C09K 8/12; C09K 2208/34; C08F 283/122; C10M 107/50; C10M 173/02; C10M 2201/02; C10M 2229/0535; C10N 2020/071
See application file for complete search history.

(56) References Cited

U.S. PATENT DOCUMENTS

2020/0157401 A1    5/2020    Xu et al.

FOREIGN PATENT DOCUMENTS

| CN | 110997882 A | * | 4/2020 | .......... C08F 293/005 |
| CN | 114773539 A |   | 7/2022 | |
| CN | 115947903 A |   | 4/2023 | |
| WO | WO-2018137508 A1 | * | 8/2018 | |

* cited by examiner

*Primary Examiner* — Kumar R Bhushan
(74) *Attorney, Agent, or Firm* — CBM PATENT CONSULTING, LLC

(57) ABSTRACT

A high-temperature and high-salt resistant hyperbranched lubricant for a water-based drilling fluid, and preparation and application thereof are provided, belonging to the technical field of oilfield chemistry. The preparation method includes the steps of: mixing tetraethyl orthosilicate (TEOS), diethanolamine (DEA), and triethanolamine (TEA) for a transesterification and polycondensation reaction to obtain highly reactive hyperbranched polysiloxane; adding an acrylamide (AM) monomer, an anionic monomer, and a polar ester monomer into deionized water to obtain a monomer solution; adjusting the pH of the monomer solution to 5-9, and then adding highly reactive hyperbranched polysiloxane; introducing nitrogen to remove oxygen, adding an initiator, and thermally initiating a polymerization reaction; and after the reaction is completed, vacuum-drying and crushing an obtained product to obtain the high-temperature and high-salt resistant hyperbranched lubricant for a water-based drilling fluid.

9 Claims, No Drawings

HIGH-TEMPERATURE AND HIGH-SALT RESISTANT HYPERBRANCHED LUBRICANT FOR WATER-BASED DRILLING FLUID, AND PREPARATION AND APPLICATION THEREOF

CROSS-REFERENCE TO RELATED APPLICATIONS

This application claims priority to Chinese Patent Application Ser. No. CN2024105360007 filed 30 Apr. 2024.

FIELD OF THE INVENTION

The present disclosure relates to a high-temperature and high-salt resistant hyperbranched lubricant for a water-based drilling fluid, and preparation and application thereof, belonging to the technical field of oilfield chemistry.

BACKGROUND OF THE INVENTION

In recent years, with the advancement of exploration theory, technology, and equipment, the exploration and development of oil and gas have continuously pushed into the deep layers of the earth. Ultra-deep oil and gas has become the main battlefield for global oil and gas reserves and production. However, due to the complex geological conditions of high temperature (>200° C.), high pressure, high salt, and high stress, an ultra-deep well drilling process often faces complex technical challenges such as high risk of wall instability, difficult borehole cleaning, and large drilling tool friction, which pose great challenges to drilling. Drilling fluids, known as "blood" in drilling engineering, are the key to determining the safety, efficiency, and success of drilling. Compared with a water-based drilling fluid, an oil-based drilling fluid has advantages in high-temperature resistance, salt-calcium resistance, lubrication, and other aspects, but due to high cost and serious environmental pollution, it must be replaced by high-performance water-based drilling fluid. Therefore, a water-based drilling fluid with high-temperature and high-salt resistance and low friction has become a hot spot in the technical field of oilfield chemistry.

Reducing the friction between a drill rod and a wall and the friction between the drill rod and casings by adding a lubricant to the drilling fluids is the key to preventing sticking, increasing the rate of penetration, and extending the life of drilling tools. The existing lubricants for drilling fluids are mainly classified into solid lubricants and liquid lubricants. Solid lubricants (graphite, plastic pellets, glass beads, etc.) are generally inert spherical or plate-like objects that change the sliding friction between the drilling tool and the wall to rolling friction, thereby substantially reducing the friction. However, the solid lubricants cannot be degraded after entering the pores of the reservoir, which will damage the reservoir, and they are easily removed by a solid control device in the drilling process, easily affecting the solid control of high-density drilling fluids. Therefore, the application of the solid lubricants in the ultra-deep wells is limited. Liquid lubricants (modified mineral oil/vegetable oil, modified extreme pressure lubricants, polymers, etc.) may be effectively adsorbed on the metal surface of the drill rod through chemical or physical action to form a stable protective friction film, effectively reducing the frictional resistance between the drilling fluids and the drilling tool and becoming a hot spot in the research of lubricants for drilling fluids.

In Chinese patent document CN109233758A, a lubricant with a small mud cake adhesion coefficient is synthesized using 75%-85% dimethyl silicone oil, 11%-18% castor oil, and 3%-8% alkylphenol polyoxyethylene ether, which may effectively reduce the frictional resistance between the drilling tool and the wall. The lubricant has a simple preparation process and high-cost effectiveness, but its high-temperature resistance only reaches 150° C., which cannot maintain ideal lubrication effect and chemical stability in deep or ultra-deep high-temperature and high-salt environments. Chinese patent document CN113185954A discloses a lubricant for drilling fluids prepared from long-chain fatty acid, light diesel oil, and stearate components and a preparation method thereof. The obtained lubricant has excellent lubricating performance and a low fluorescence grade, effectively avoiding the harm to the environment and technical personnel. Meanwhile, the lubricant has good compatibility with the drilling fluids and has a very low foaming rate, which is beneficial for maintaining the stability of the drilling fluids. However, the lubricant cannot solve the problem of high friction and high torque in deep and ultra-deep wells under harsh geological conditions due to the failure to evaluate its high-temperature and high-salt resistance. Chinese patent document CN105086954A discloses a lubricant for drilling fluids prepared from white oil, sulfurized olefin cottonseed oil, a flow conditioning agent, and a surfactant, where its extreme pressure lubrication coefficient reduction rate is up to 94%, and the average mud cake adhesion lubrication coefficient reduction rate is higher than 65%, but its high-temperature resistance only reaches 180° C., and its high-salt resistance is not considered. In Chinese patent document CN110564382A, a new high-salt resistant lubricant is prepared by modifying polysiloxane and supplementing sodium dodecylbenzene sulfonate, which has an obvious high-salt resistant effect and good dispersion, effectively preventing aggregation and deposition of solid particles in a high salinity environment. As the depth of oil and gas exploration increases, the lubricants for drilling fluids should have better high-temperature resistance to adapt to harsh working conditions.

In summary, the molecular chains of the current fluid lubricants for drilling fluids are prone to degradation, cross-linking, curling, and other conformational transitions in the high-temperature and high-salt environments, leading to structural damage, resulting in reduced adsorption on the surface of drilling tools, a decrease in lubricating performance, or even a loss of lubrication efficiency. Therefore, there is an urgent need to develop a high-temperature and high-salt resistant and strong adsorptive liquid lubricant for a water-based drilling fluid through a new preparation method, thereby supporting the safe, efficient, and economical drilling of ultra-deep wells.

SUMMARY OF THE INVENTION

In view of the deficiencies in the related art, and particularly the technical problem of lubrication failure of the existing liquid lubricants for a water-based drilling fluid in high-temperature and high-salt environments, the present disclosure provides a high-temperature and high-salt resistant hyperbranched lubricant for a water-based drilling fluid, and preparation and application thereof. The hyperbranched lubricant of the present disclosure has excellent performance of high-temperature and high-salt resistance and strong adsorptive lubrication without affecting the rheology of the drilling fluid system and may provide innovative thinking for the development of ultra-high-temperature and high-salt resistant water-based drilling fluid technology, thereby supporting the safe, efficient, and economical drilling of ultra-deep wells.

The technical solutions of the present disclosure are as follows.

(1) A preparation method of a high-temperature and high-salt resistant hyperbranched lubricant for a water-based drilling fluid is provided, including the steps of:

synthesis of highly reactive hyperbranched polysiloxane
mixing tetraethyl orthosilicate (TEOS), diethanolamine (DEA), and triethanolamine (TEA), and stirring uniformly for a transesterification and polycondensation reaction; and after the reaction is completed, performing dialysis and freeze-drying to obtain highly reactive hyperbranched polysiloxane; and (2) preparation of high-temperature and high-salt resistant hyperbranched lubricant adding an acrylamide (AM) monomer, an anionic monomer, and a polar ester monomer into deionized water to obtain a monomer solution; adjusting the pH of the monomer solution to 5-9, and then adding highly reactive hyperbranched polysiloxane prepared in step (1) to obtain a mixed reaction solution; introducing nitrogen to remove oxygen, raising the temperature to a reaction temperature, adding an initiator, and thermally initiating a polymerization reaction; and after the reaction is completed, vacuum-drying and crushing an obtained product to obtain the high-temperature and high-salt resistant hyperbranched lubricant for a water-based drilling fluid.

According to the present disclosure, in step (1), a mass ratio of TEOS, DEA, and TEA is preferably 1-5:3:2, further preferably 3-4:3:2.

According to the present disclosure, in step (1), the transesterification and polycondensation reaction is preferably performed at a temperature of 60-100° C., further preferably 80-90° C. for 3-7 h, further preferably 5-6 h under the protection of nitrogen.

According to the present disclosure, in step (1), the dialysis includes the steps of: putting a reaction solution obtained from the reaction into a dialysis bag, and performing dialysis purification in ethanol for preferably 12-48 h, further preferably 20-30 h, where a molecular weight cutoff of the dialysis bag used is 1000-5000 Da, further preferably 3000-5000 Da.

According to the present disclosure, in step (1), the freeze-drying is preferably performed at a temperature of −70-−40° C., further preferably from −60-−50° C. for 10-15 h.

According to the present disclosure, in step (2), the AM monomer is preferably one of or a combination of two or more of AM, methacrylamide (MAM), and N,N-dimethylacrylamide (DMAA).

According to the present disclosure, in step (2), the anionic monomer is preferably one of or a combination of two or more of 2-acrylamido-2-methylpropane sulfonic acid (AMPS), sodium styrene sulfonate (SSS), and vinyl sulfonate (VS).

According to the present disclosure, in step (2), the polar ester monomer is preferably one of or a combination of two or more of glycidyl methacrylate (GMA), hydroxyethyl acrylate (HEA), and butyl acrylate (BA).

According to the present disclosure, in step (2), a mass ratio of the AM monomer, the anionic monomer, and the polar ester monomer is preferably 1-7:1-2:1-2, further preferably 4-5:1-2:1-2; a total mass fraction of the monomer solution is 10-40%, further preferably 15-30%; the total mass of monomers refers to a sum of the masses of the AM monomer, the anionic monomer, and the polar ester monomer.

According to the present disclosure, preferably, in step (2), the pH of the monomer solution is adjusted to 5-9 using a NaOH aqueous solution with a mass fraction of 20-30%.

According to the present disclosure, in step (2), a ratio of the mass of highly reactive hyperbranched polysiloxane to the total mass of the AM monomer, the anionic monomer, and the polar ester monomer is preferably 0.05-0.15:1.

According to the present disclosure, in step (2), the initiator is preferably cerium ammonium nitrate (CAN); a ratio of the mass of the initiator to the total mass of the AM monomer, the anionic monomer, and the polar ester monomer is 0.01-0.05:1, further preferably 0.02-0.03:1.

According to the present disclosure, in step (2), the polymerization reaction is preferably performed at a temperature of 30-80° C., further preferably 50-70° C. for 2-6 h, further preferably 3-5 h.

According to the present disclosure, in step (2), the vacuum-drying is preferably performed at a temperature of 30-70° C., further preferably 40-60° C. for 3-7 h, further preferably 4-6 h.

A high-temperature and high-salt resistant hyperbranched lubricant for a water-based drilling fluid is provided and prepared by the above-mentioned preparation method.

According to the present disclosure, application of the above-mentioned high-temperature and high-salt resistant hyperbranched lubricant for a water-based drilling fluid in a water-based drilling fluid is provided. Preferably, the concentration of the high-temperature and high-salt resistant hyperbranched lubricant in the water-based drilling fluid is 5-30 g/L.

The technical features and beneficial effects of the present disclosure are as follows:

1) The hyperbranched lubricant of the present disclosure has a highly branched three-dimensional structure. Compared with a conventional linear polymer lubricant, it has low cohesion between polymer chains, low entanglement of molecular chains, low molecular weight, and low viscosity.

2) The hyperbranched lubricant of the present disclosure has a "silicon-oxygen" bond with a relatively high bond energy in the main chain of the molecule, giving the hyperbranched lubricant excellent high-temperature resistance.

3) Branched chains of the hyperbranched lubricant of the present disclosure have multiple adsorption sites and may strongly adsorb to the surfaces of the drill rod and the drill bit by hydrogen bonding and electrostatic interaction to form a lubrication film, thereby reducing the friction between the drill rod and the mud cake and the friction between the drill bit and the mud cake.

4) In the present disclosure, the high-temperature and high-salt resistant hyperbranched lubricant prepared in a specific ratio according to the present disclosure still has an excellent lubricating ability after high-temperature (220° C.) and high-salt (saturated salt) aging through the synergistic effect of the monomers and can effectively reduce the downhole friction during the drilling of ultra-deep wells.

DETAILED DESCRIPTION OF THE EMBODIMENTS

The present disclosure will be further described with reference to specific examples, but the present disclosure is not limited thereto.

Example 1

A preparation method of a high-temperature and high-salt resistant hyperbranched lubricant for a water-based drilling fluid is provided, including the following steps:

(1) Synthesis of highly reactive hyperbranched polysiloxane.

(2) 40 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant, (2.1) 5 g of DMAA, 2 g of AMPS, and 2 g of HEA were dissolved in 45 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.9 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.27 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 2

A preparation method of a high-temperature and high-salt resistant hyperbranched lubricant for a water-based drilling fluid is provided, including the following steps:

(1) Synthesis of highly reactive hyperbranched polysiloxane.

(2) 40 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant.

(2.1) 4 g of DMAA, 2 g of AMPS, and 2 g of HEA were dissolved in 40 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.8 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.24 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 3

A preparation method of a high-temperature and high-salt resistant hyperbranched lubricant for a water-based drilling fluid is provided, including the following steps:

(1) Synthesis of highly reactive hyperbranched polysiloxane.

(2) 30 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant.

(2.1) 4 g of DMAA, 2 g of AMPS, and 2 g of HEA were dissolved in 40 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.8 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.24 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 4

A preparation method of a high-temperature and high-salt resistant hyperbranched lubricant for a water-based drilling fluid is provided, including the following steps:

(1) Synthesis of highly reactive hyperbranched polysiloxane.

(2) 40 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant.

(2.1) 5 g of DMAA, 2 g of AMPS, and 2 g of HEA were dissolved in 45 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.72 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.18 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 5

A preparation method of a high-temperature and high-salt resistant hyperbranched lubricant for a water-based drilling fluid is provided, including the following steps:

(1) Synthesis of highly reactive hyperbranched polysiloxane.

(2) 40 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant.

(2.1) 5 g of DMAA, 1 g of AMPS, and 2 g of HEA were dissolved in 40 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.64 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.16 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 6

A preparation method of a high-temperature and high-salt resistant hyperbranched lubricant for a water-based drilling fluid is provided, including the following steps:

(1) Synthesis of highly reactive hyperbranched polysiloxane.

(2) 40 g of TEOS and 30 g of DEA were added into a three-neck flask, and then 20 g of TEA was added and stirred uniformly to obtain a mixed solution.

(3) The mixed solution obtained in the above-mentioned step (1.1) was heated to 80° C. under the protection of nitrogen and stirred for reaction for 6 h. A reacted solution was naturally cooled to room temperature, put into a dialysis bag with a molecular weight cutoff of 4000 Da, and dialyzed in ethanol for 24 h. Then, a product was freeze-dried (−50° C., 12 h) to obtain highly reactive hyperbranched polysiloxane.

(4) Preparation of high-temperature and high-salt resistant hyperbranched lubricant.

(2.1) 5 g of DMAA, 1 g of AMPS, and 2 g of BA were dissolved in 40 g of deionized water to obtain a monomer solution A.

(2.2) A NaOH aqueous solution with a mass fraction of 25% was slowly dropwise (1 drop/s) added to the monomer solution A obtained in the above-mentioned step (2.1) under stirring conditions to adjust the pH value of the monomer solution to 8, and then 0.8 g of highly reactive hyperbranched polysiloxane prepared in step (1.2) was added to obtain a mixed reaction solution B.

(2.3) The mixed reaction solution B obtained in the above-mentioned step (2.2) was subjected to oxygen removal under the protection of nitrogen for 30 min and then heated to 60° C. 0.24 g of initiator CAN was added, and a polymerization reaction was performed at 60° C. for 5 h. After the reaction was completed, an obtained product was placed into a vacuum drying oven for drying at 60° C. for 5 h and then crushed to obtain a high-temperature and high-salt resistant hyperbranched lubricant for a water-based drilling fluid.

Example 7

A preparation method of a high-temperature and high-salt resistant hyperbranched lubricant for a water-based drilling fluid is provided, which differs from the description in example 1 in that: in step (2.3), a reaction temperature of the mixed solution was set to 75° C.

Example 8

A preparation method of a high-temperature and high-salt resistant hyperbranched lubricant for a water-based drilling fluid is provided, which differs from the description in example 1 in that: in step (2.2), the pH value of the monomer solution was adjusted to 9.

Example 9

A preparation method of a high-temperature and high-salt resistant hyperbranched lubricant for a water-based drilling fluid is provided, which differs from the description in example 1 in that: an equivalent amount of AM was used in step (2.1) instead of DMAA, and other conditions and component ratios were the same as those in example 1.

Example 10

A preparation method of a high-temperature and high-salt resistant hyperbranched lubricant for a water-based drilling fluid is provided, which differs from the description in example 1 in that: an equivalent amount of VS was used in step (2.1) instead of AMPS, and other conditions and component ratios were the same as those in example 1.

Comparative Example 1

A preparation method of a high-temperature and high-salt resistant hyperbranched lubricant is provided, which differs from the description in example 1 in that: in step (2.2), an addition amount of highly reactive hyperbranched polysiloxane was 2 g.

Comparative Example 2

A preparation method of a high-temperature and high-salt resistant lubricant is provided, which differs from the description in example 1 in that: in step (2.2), an addition amount of highly reactive hyperbranched polysiloxane was 0 g.

Comparative Example 3

A preparation method of a high-temperature and high-salt resistant hyperbranched lubricant is provided, which differs from the description in example 1 in that: an equivalent amount of ammonium persulfate (APS) was directly used in step (2.3) instead of CAN, and other conditions and component ratios were the same as those in example 1.

Comparative Example 4

A preparation method of a high-temperature and high-salt resistant hyperbranched lubricant is provided, which differs from the description in example 1 in that: in step (2.1), DMAA was not added.

Comparative Example 5

A preparation method of a high-temperature and high-salt resistant hyperbranched lubricant is provided, which differs from the description in example 1 in that: in step (2.1), AMPS was not added.

Comparative Example 6

A preparation method of a high-temperature and high-salt resistant hyperbranched lubricant is provided, which differs from the description in example 1 in that: in step (2.1), HEA was not added.

Comparative Example 7

A preparation method of a high-temperature and high-salt resistant hyperbranched lubricant is provided, which differs from the description in example 1 in that: an equivalent amount of tetramethoxysilane (TMOS) was directly used in step (1.1) instead of TEOS, and other conditions and component ratios were the same as those in example 1.

Comparative Example 8

A preparation method of a high-temperature and high-salt resistant hyperbranched lubricant is provided, which differs from the description in example 1 in that: an equivalent amount of 2-hydroxypropyl methacrylate (HPMA) was used in step (2.1) instead of HEA, and other conditions and component ratios were the same as those in example 1.

Comparative Example 9

Comparative example 9 provides a commercially available liquid lubricant SYP-2 for a drilling fluid, purchased from Shandong Deshunyuan Petroleum Science and Technology Co. Ltd.

Experimental Example

The lubricants prepared in the examples and comparative examples are tested with reference to the following method, and the specific steps are as follows.

Configuration of 4% bentonite-based slurry: 16 g of bentonite and 0.6 g of anhydrous sodium carbonate were added into 400 g of distilled water and sufficiently stirred at room temperature for 20 min under a rotation speed of 8000 rpm. In this process, at least two interruptions were made to scrape off the adherent from the cup wall, followed by sealing and standing for hydration at 25° C.±1° C. for 24 h.

Configuration of drilling fluid sample: 400 mL of 4% bentonite-based slurry was taken, and 2 g (0.5%) of the lubricants developed in the examples and comparative examples were added and stirred at room temperature for 20 min under a rotation speed of 6000 r/min.

Configuration of 4% saline drilling fluid sample: 400 mL of 4% bentonite-based slurry was taken, 2 g (0.5%) of the lubricants developed in the examples and comparative examples were added and stirred at room temperature for 20 min under a rotation speed of 6000 r/min. Then, 16 g (4%) of sodium chloride was added and stirred at room temperature for 20 min under a rotation speed of 4000 r/min.

Configuration of saturated saline drilling fluid sample: 400 mL of 4% bentonite-based slurry was taken, 2 g (0.5%) of the lubricants developed in the examples and comparative examples were added and stirred at room temperature for 20 min under a rotation speed of 6000 r/min. Then, 144 g (36%) of sodium chloride was added and stirred at room temperature for 20 min under a rotation speed of 4000 r/min.

(I) Evaluation on Lubrication Coefficient Reduction Rate in Fresh Water Slurry

The prepared drilling fluid samples were stirred under 4000 r/min for 20 min, and their lubrication torques were measured using an extreme pressure lubricator. The lubrication coefficient reduction rates of the drilling fluids were calculated according to Equation (1), and the specific evaluation data were shown in Table 1.

$$R_i = (K_0 - K_i)/K_0 \times 100\% \tag{1},$$

where $R_i$ is the lubrication coefficient reduction rate of the drilling fluid sample, %; $K_0$ is a torque value of the base slurry; $K_i$ is a torque value of the drilling fluid sample.

(II) Rheological Performance Evaluation of Drilling Fluid API

The prepared drilling fluid samples were stirred at room temperature for 20 min at a high speed of 4000 r/min. The apparent viscosity and plastic viscosity of the above-mentioned drilling fluids were measured according to GB/T16783.1 2006, and the evaluation data were shown in Table 1.

TABLE 1

Table of rheological and lubricating performance data for base slurries containing lubricants of examples

| Test sample | Lubrication coefficient reduction rate (%) | AV (mPa · s) | PV (mPa · s) | YP (pa) |
|---|---|---|---|---|
| Base slurry | — | 7 | 6 | 1 |
| Base slurry + 0.5% example 1 | 98.2 | 9 | 8 | 1 |
| Base slurry + 0.5% example 2 | 94.3 | 7 | 6 | 1 |
| Base slurry + 0.5% example 3 | 93.2 | 8 | 7 | 1 |
| Base slurry + 0.5% example 4 | 90.2 | 7 | 6 | 1 |
| Base slurry + 0.5% example 5 | 91.3 | 7 | 6 | 1 |
| Base slurry + 0.5% example 6 | 92.4 | 8 | 7 | 1 |
| Base slurry + 0.5% example 7 | 88.5 | 10 | 8 | 2 |
| Base slurry + 0.5% example 8 | 86.6 | 9 | 8 | 1 |
| Base slurry + 0.5% example 9 | 91.4 | 10 | 9 | 1 |
| Base slurry + 0.5% example 10 | 89.7 | 9 | 8 | 1 |

It can be seen from the data in Table 1 that the lubricants developed in the examples of the present disclosure have little effect on the rheological performance of the base slurries of the drilling fluids, indicating good compatibility with the drilling fluids. At room temperature, the average lubrication coefficient reduction rate of the drilling fluids to which the lubricants of the examples of the present disclosure are added is greater than 86.6%, which is better than the specified standard of >80%. The lubricants of the examples of the present disclosure may all minimize the frictional resistance between the drilling tool and the wall and improve the production efficiency of the drilling operation, thereby adapting to the formation environment requirements of complicated and challenging deep wells and ultra-deep wells.

TABLE 2

Table of rheological and lubricating performance data for base slurries containing lubricants of comparative examples

| Test sample | Lubrication coefficient reduction rate (%) | AV (mPa · s) | PV (mPa · s) | YP (pa) |
|---|---|---|---|---|
| Base slurry + 0.5% comparative example 1 | 84.2 | 8 | 6.5 | 1.5 |
| Base slurry + 0.5% comparative example 2 | 52.3 | 13 | 11 | 2 |
| Base slurry + 0.5% comparative example 3 | 65.3 | 15 | 13 | 2 |
| Base slurry + 0.5% comparative example 4 | 67.2 | 10 | 7 | 3 |
| Base slurry + 0.5% comparative example 5 | 56.7 | 12 | 9 | 3 |
| Base slurry + 0.5% comparative example 6 | 67.8 | 11 | 9 | 2 |
| Base slurry + 0.5% comparative example 7 | 75.3 | 10 | 7 | 3 |
| Base slurry + 0.5% comparative example 8 | 71.2 | 11 | 9 | 2 |
| Base slurry + 0.5% comparative example 9 | 87.2 | 12 | 9 | 3 |

The performance detection data of the examples and the comparative examples were compared. In comparative example 1, the amount of highly reactive hyperbranched polysiloxane was increased so that the degree of branching of the hyperbranched polymer was reduced, its adsorption on the surface of the drilling tool was reduced, and thus its lubricating performance was reduced. In comparative example 2, highly reactive hyperbranched polysiloxane was not added, and the linear polymer had a large molecular weight so that the viscosity was increased, the rheological parameter of the base slurry was high, and the lubricating performance was weak. In comparative example 3, APS was used instead of CAN of the present disclosure, and a redox initiation system of CAN and hydroxyl group could not be formed, thereby hindering the initiation of hyperbranched polymer chains and generating more linear polymer network structures. The lubricant did not have sufficient adsorption sites, and therefore the lubricating performance was weak, and the rheological parameter was large. In comparative example 4, the AM monomer was not contained, and the polymer lacked a polar group and had poor adhesive protection performance for the base slurry so that an adsorption film was difficult to form to enhance the lubricating performance. In comparative example 5, an anionic hydration monomer was not contained, and the thickness of a hydration film adsorbed on the surface of the mud cake decreased, increasing the sliding friction force. In comparative example 6, the polar ester monomer was not contained so that the amount of lubricant adsorbed on the surface of the drilling tool and the drill bit decreased, and the lubricating performance decreased. In comparative example 7, TMOS was directly used instead of TEOS of the present disclosure so that the plastic viscosity and the yield point were significantly increased. In comparative example 8, HPMA was used instead of HEA, and the ether bonds increased during the polymerization process so that the hydroxyl group content in the polymer decreased, and a strong adsorption lubrication film could not be formed to improve the lubricating performance. In comparative example 9, a domestic lubricant SYP-2 was used, the viscosity of the base slurry increased significantly, and foaming was serious, affecting the real density measurement of the drilling fluid. In summary, the hyperbranched lubricant of the present disclosure does not substantially change the rheology of the fresh water base slurry, and it can undergo multi-point adsorption through terminal polar groups, thereby increasing the lubricating effect.

(IV) Evaluation of High-Temperature Resistance

The prepared drilling fluid samples were stirred under 4000 r/min for 8 min, poured into aging kettles, subjected to heat-rolling aging at 180° C., 200° C., and 220° C. for 16 h, cooled to room temperature, and stirred at a high speed of 4000 r/min for 8 min. Their lubrication torques were measured using an extreme pressure lubricator, the lubrication coefficient reduction rates were calculated, and the evaluation data were shown in Table 3.

TABLE 3

Table of lubricating performance data for base slurries containing lubricants of examples after aging at different temperatures

| Test sample | Lubrication coefficient reduction rate after aging at 180° C. for 16 h (%) | Lubrication coefficient reduction rate after aging at 200° C. for 16 h (%) | Lubrication coefficient reduction rate after aging at 220° C. for 16 h (%) |
|---|---|---|---|
| Base slurry + 0.5% example 1 | 92.2 | 90.3 | 87.3 |
| Base slurry + 0.5% example 2 | 88.3 | 86.4 | 83.4 |
| Base slurry + 0.5% example 3 | 87.2 | 85.3 | 82.3 |
| Base slurry + 0.5% example 4 | 84.2 | 82.3 | 79.3 |
| Base slurry + 0.5% example 5 | 85.3 | 83.4 | 80.4 |
| Base slurry + 0.5% example 6 | 86.4 | 84.5 | 81.5 |
| Base slurry + 0.5% example 7 | 82.5 | 80.6 | 77.6 |
| Base slurry + 0.5% example 8 | 80.6 | 78.7 | 75.7 |
| Base slurry + 0.5% example 9 | 85.4 | 83.5 | 80.5 |
| Base slurry + 0.5% example 10 | 83.7 | 81.8 | 78.8 |

It can be seen from the data in Table 3 that the average lubrication coefficient reduction rate of the drilling fluids to which the lubricants of the examples of the present disclosure are added after aging at 180° C. for 16 h is greater than 80.6%. When the aging temperature is increased to 200° C., the average lubrication coefficient reduction rate is greater than 78.7%, and when the aging temperature is increased to 220° C., the average lubrication coefficient reduction rate remains above 75.7%. The lubricants of the examples of the present disclosure all have excellent high-temperature resistance.

TABLE 4

Table of lubricating performance data for base slurries containing lubricants of comparative examples after aging at different temperatures

| Test sample | Lubrication coefficient reduction rate after aging at 180° C. for 16 h (%) | Lubrication coefficient reduction rate after aging at 200° C. for 16 h (%) | Lubrication coefficient reduction rate after aging at 220° C. for 16 h (%) |
|---|---|---|---|
| Base slurry + 0.5% comparative example 1 | 78.3 | 73.4 | 68.4 |
| Base slurry + 0.5% comparative example 2 | 46.4 | 41.3 | 36.3 |
| Base slurry + 0.5% comparative example 3 | 59.4 | 54.5 | 49.5 |
| Base slurry + 0.5% comparative example 4 | 61.3 | 56.4 | 51.4 |
| Base slurry + 0.5% comparative example 5 | 50.8 | 45.6 | 40.6 |
| Base slurry + 0.5% comparative example 6 | 61.7 | 57.1 | 52.1 |
| Base slurry + 0.5% comparative example 7 | 69.4 | 64.5 | 59.5 |
| Base slurry + 0.5% comparative example 8 | 65.3 | 60.4 | 55.4 |
| Base slurry + 0.5% comparative example 9 | 81.3 | 76.4 | 71.4 |

The performance detection data of the examples and the comparative examples were compared. In comparative example 1, the degree of branching of the hyperbranched polymer was reduced, and the temperature resistance was reduced. In comparative example 2, the linear polymer had a large molecular weight, and the polymer chain was easily degraded at a high temperature. In comparative example 3, more linear polymer network structures were generated, and the temperature resistance was weakened. In comparative example 4, a DMAA monomer was not contained, the adhesive protection performance of bentonite at a high temperature was weakened, and the lubricating performance was reduced. In comparative example 5, a high-temperature resistant anionic hydration monomer was not contained, the effect of particle aggregation in the base slurry at a high temperature was obvious, and the lubricating performance deteriorated. In comparative Example 6, a polar ester monomer was not contained, and the lubricating performance decreased. In comparative example 7, TMOS was directly used instead of TEOS of the present disclosure, and the lubricating performance was low. In comparative example 8, HPMA was directly used instead of HEA, the molecular chain was easily degraded at a high temperature, and the lubricating performance failed. In comparative example 9, a domestic lubricant SYP-2 was used, and the temperature resistance was weak. In summary, the hyperbranched lubricant of the present disclosure has excellent temperature resistance, thereby reducing the downhole friction during the drilling of ultra-deep wells.

(V) Evaluation of High-Salt Resistance

4% saline drilling fluid sample and saturated saline drilling fluid sample were stirred at a high speed of 4000 r/min for 8 min, poured into aging kettles, subjected to heat-rolling aging at 220° C. for 16 h, cooled to room temperature, and stirred at a high speed of 4000 r/min for 8 min. Their lubrication torques were measured using an extreme pressure lubricator, the lubrication coefficient reduction rates were calculated, and the evaluation data were shown in Table 5.

TABLE 5

Table of lubricating performance data for saline base slurries containing lubricants of examples after high-temperature aging

| Test sample | Lubrication coefficient reduction rate of 4% saline drilling fluid (%) | Lubrication coefficient reduction rate of 4% saline drilling fluid after aging at 220° C. for 16 h (%) | Lubrication coefficient reduction rate of saturated saline drilling fluid (%) | Lubrication coefficient reduction rate of saturated saline drilling fluid after aging at 220° C. for 16 h (%) |
|---|---|---|---|---|
| Example 1 | 92.3 | 84.6 | 89.4 | 76.3 |
| Example 2 | 88.5 | 81.1 | 85.7 | 75.4 |
| Example 3 | 87.2 | 80.5 | 84.3 | 73.9 |
| Example 4 | 85.4 | 78.4 | 82.2 | 72.3 |
| Example 5 | 84.8 | 77.2 | 81.2 | 71.5 |
| Example 6 | 86.5 | 79.3 | 83.4 | 72.6 |
| Example 7 | 83.3 | 76.4 | 80.3 | 69.4 |
| Example 8 | 81.2 | 74.7 | 79.5 | 68.2 |
| Example 9 | 86.2 | 78.7 | 83.1 | 72.3 |
| Example 10 | 85.7 | 77.5 | 82.6 | 72.7 |

It can be seen from the data in Table 5 that the average lubrication coefficient reduction rate of 4% saline drilling fluids to which the lubricants of the examples of the present disclosure are added is greater than 81%, and even under extreme conditions, the lubrication coefficient reduction rate of 4% saline mud after aging at 220° C. for 16 h remains above 74%. For saturated saline mud, the lubrication coefficient reduction rate is also more than 79%, and the reduction rate can be maintained above 68% after being subjected to high-temperature aging at 220° C. for 16 h. The lubricants of the examples of the present disclosure exhibit efficient performance in high-salt and high-temperature environments and have great practical significance for improving the efficiency of drilling operations, reducing device wear, and operating costs.

TABLE 6

Table of lubricating performance data for saline base slurries containing lubricants of comparative examples after high-temperature aging

| Test sample | Lubrication coefficient reduction rate of 4% saline fluid (%) | Lubrication coefficient reduction rate of 4% saline drilling fluid after aging at (%) | Lubrication coefficient reduction rate of saturated saline drilling fluid (%) | Lubrication coefficient reduction rate of saturated saline drilling fluid after for 16 h (%) |
|---|---|---|---|---|
| Comparative example 1 | 79.5 | 65.2 | 74.3 | 59.6 |
| Comparative example 2 | 47.3 | 33.1 | 43.2 | 26.9 |
| Comparative example 3 | 60.3 | 46.3 | 56.3 | 40.1 |
| Comparative example 4 | 62.7 | 48.2 | 57.4 | 42.5 |
| Comparative example 5 | 51.3 | 37.4 | 47.3 | 31.2 |
| Comparative example 6 | 62.3 | 48.9 | 57.1 | 42.7 |
| Comparative example 7 | 69.6 | 56.3 | 65.6 | 50.1 |
| Comparative example 8 | 67.4 | 52.2 | 67.2 | 46.7 |
| Comparative example 9 | 80.3 | 68.2 | 76.4 | 62.3 |

In summary, the high-temperature and high-salt resistant hyperbranched lubricant developed by the present disclosure can effectively improve the lubricating performance of the drilling fluid in an ultra-high-temperature (220° C.) and high-salt (saturated salt) environment, solve the technical problem of poor lubricating performance of the existing lubricants for a water-based drilling fluid in the high-temperature and high-salt environment, and has little impact on the rheology of the drilling fluid, thereby promoting further development of the technology of an ultra-high-temperature and high-salt resistant as well as high-density water-based drilling fluid for ultra-deep wells.

What is claimed is:

1. A preparation method of a high-temperature and high-salt resistant hyperbranched lubricant for a water-based drilling fluid, comprising the steps of:
   (1) synthesis of highly reactive hyperbranched polysiloxane
   mixing tetraethyl orthosilicate (TEOS), diethanolamine (DEA), and triethanolamine (TEA), and stirring uniformly for a transesterification and polycondensation reaction; and after the reaction is completed, performing dialysis and freeze-drying to obtain highly reactive hyperbranched polysiloxane, wherein a mass ratio of TEOS, DEA, and TEA is 1-5:3:2; the transesterification and polycondensation reaction is performed at a temperature of 60-100° C. for 3-7 h; and
   (2) preparation of high-temperature and high-salt resistant hyperbranched lubricant
   adding an acrylamide (AM) monomer, an anionic monomer, and a polar ester monomer into deionized water to obtain a monomer solution; adjusting the pH of the monomer solution to 5-9, and then adding highly reactive hyperbranched polysiloxane prepared in step (1) to obtain a mixed reaction solution; introducing nitrogen to remove oxygen, raising the temperature to a reaction temperature, adding an initiator, and thermally initiating a polymerization reaction; and after the reaction is completed, vacuum-drying and crushing an obtained product to obtain the high-temperature and high-salt resistant hyperbranched lubricant for a water-based drilling fluid, wherein the AM monomer is one of or a combination of two or more of AM, methacrylamide (MAM), and N,N-dimethylacrylamide (DMAA); the anionic monomer is one of or a combination of two or more of 2-acrylamido-2-methylpropane sulfonic acid (AMPS), sodium styrene sulfonate (SSS), and vinyl sulfonate (VS); the polar ester monomer is one of or a combination of hydroxyethyl acrylate (HEA) and butyl acrylate (BA); a mass ratio of the AM monomer, the anionic monomer, and the polar ester monomer is 1-7:1-2:1-2; a ratio of the mass of highly reactive hyperbranched polysiloxane to the total mass of the AM monomer, the anionic monomer, and the polar ester monomer is 0.05-0.15:1;

the initiator is cerium ammonium nitrate (CAN);

the polymerization reaction is performed at a temperature of 30-80° C. for 2-6 h.

2. The preparation method of a high-temperature and high-salt resistant hyperbranched lubricant for a water-based drilling fluid according to claim 1, wherein in step (1), the mass ratio of TEOS, DEA, and TEA is 3-4:3:2.

3. The preparation method of a high-temperature and high-salt resistant hyperbranched lubricant for a water-based drilling fluid according to claim 1, wherein in step (1), the transesterification and polycondensation reaction is performed at a temperature of 80-90° C. for 5-6 h under the protection of nitrogen;

the dialysis comprises the steps of: putting a reaction solution obtained from the reaction into a dialysis bag, and performing dialysis purification in ethanol for 12-48 h, wherein a molecular weight cutoff of the dialysis bag used is 1000-5000 Da;

the freeze-drying is performed at a temperature of −70-−40° C. for 10-15 h.

4. The preparation method of a high-temperature and high-salt resistant hyperbranched lubricant for a water-based drilling fluid according to claim 1, wherein in step (2), the mass ratio of the AM monomer, the anionic monomer, and the polar ester monomer is 4-5:1-2:1-2; a total mass fraction of the monomer solution is 10-40%;

in step (2), the pH of the monomer solution is adjusted to 5-9 using a NaOH aqueous solution with a mass fraction of 20-30%.

5. The preparation method of a high-temperature and high-salt resistant hyperbranched lubricant for a water-based drilling fluid according to claim 1, wherein in step (2), a total mass fraction of the monomer solution is 15-30%.

6. The preparation method of a high-temperature and high-salt resistant hyperbranched lubricant for a water-based drilling fluid according to claim 1, wherein in step (2), a ratio of the mass of the initiator to the total mass of the AM monomer, the anionic monomer, and the polar ester monomer is 0.01-0.05:1.

7. The preparation method of a high-temperature and high-salt resistant hyperbranched lubricant for a water-based drilling fluid according to claim 1, wherein in step (2), a ratio of the mass of the initiator to the total mass of the AM monomer, the anionic monomer, and the polar ester monomer is 0.02-0.03:1.

8. The preparation method of a high-temperature and high-salt resistant hyperbranched lubricant for a water-based drilling fluid according to claim 1, wherein in step (2), the polymerization reaction is performed at a temperature of 50-70° C. for 3-5 h;

the vacuum-drying is performed at a temperature of 30-70° C. for 3-7 h.

9. A high-temperature and high-salt resistant hyperbranched lubricant for a water-based drilling fluid prepared by the preparation method according to claim 1.

* * * * *